April 15, 1952 E. UTTERBACK ET AL 2,593,224

GRAPHIC INDICATOR RESPONSIVE TO A PLURALITY OF CONDITIONS IN A CONTINUOUS PROCESSING SYSTEM

Filed Sept. 7, 1944 8 Sheets-Sheet 1

Fig. 1,

INVENTORS
ERNEST UTTERBACK
WILLIAM A. HAGERBAUMER
ROY E. DOOLEY
BY James Y. Cleveland
ATTORNEY INVENTORS
ERNEST UTTERBACK
WILLIAM A. HAGERBAUMER
ROY E. DOOLEY
BY James Y. Cleveland
ATTORNEY April 15, 1952 E. UTTERBACK ET AL 2,593,224

GRAPHIC INDICATOR RESPONSIVE TO A PLURALITY OF CONDITIONS IN A CONTINUOUS PROCESSING SYSTEM

Filed Sept. 7, 1944 8 Sheets-Sheet 3

INVENTORS
ERNEST UTTERBACK
WILLIAM A. HAGERBAUMER
ROY E. DOOLEY
BY James G. Cleveland
ATTORNEY

Fig. 5,

INVENTORS
ERNEST UTTERBACK
WILLIAM A. HAGERBAUMER
ROY E. DOOLEY
BY James Y. Cleveland
ATTORNEY INVENTORS
ERNEST UTTERBACK
WILLIAM A. HAGERBAUMER
ROY E. DOOLEY
BY James Y. Cleveland
ATTORNEY

Fig. 7,

INVENTORS
ERNEST UTTERBACK
WILLIAM A. HAGERBAUMER
ROY E. DOOLEY
BY James G. Cleveland
ATTORNEY INVENTORS
ERNEST UTTERBACK
WILLIAM A. HAGERBAUMER
ROY E. DOOLEY
BY James Y. Cleveland
ATTORNEY Fig. 9,
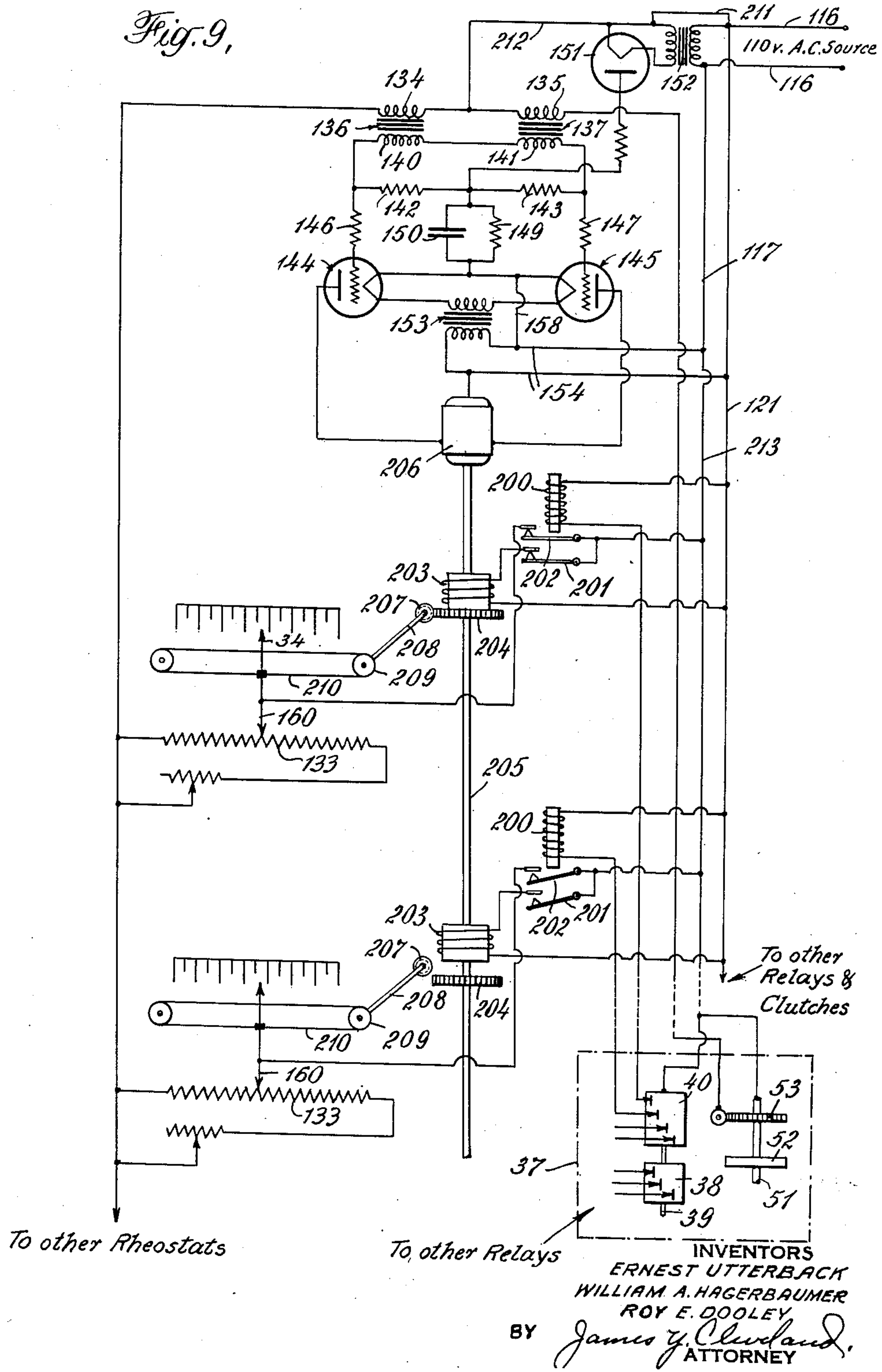
INVENTORS
ERNEST UTTERBACK
WILLIAM A. HAGERBAUMER
ROY E. DOOLEY
BY James Y. Cleveland,
ATTORNEY Patented Apr. 15, 1952

2,593,224

UNITED STATES PATENT OFFICE 2,593,224

GRAPHIC INDICATOR RESPONSIVE TO A PLURALITY OF CONDITIONS IN A CONTINUOUS PROCESSING SYSTEM

Ernest Utterback, Upper Darby, William A. Hagerbaumer, Brookline, Pa., and Roy E. Dooley, Rockaway, N. J., assignors to Socony-Vacuum Oil Company, Incorporated, New York, N. Y., a corporation of New York Application September 7, 1944, Serial No. 553,054

2 Claims. (Cl. 73—341)

This invention relates generally to graphic indicating devices and more particularly to indicating devices for keeping the operator of continuous processing equipment informed of the conditions of the equipment.

In the operation of modern continuous processing equipment, the success of the entire process depends upon continually keeping operations in step with respect to various variables, such as, temperature, velocity or time; for example, any slow down of one end of a unit timing would seriously upset the operation of other parts of the unit.

This condition has been encountered in the prior art and met on commercial units by the installation of a multiplicity of recording instruments and indicators to permit the operating crew to keep informed of the conditions of the unit. Because of the speed with which changes occur in large installations, it is necessary to have some form of analyzing or indicating equipment by means of which an operator can size up the situation at a single glance. It is the purpose of this invention to provide such equipment.

As an example, the operation of an indicator of this type as applied to a process for catalytic conversion of hydrocarbons will be described. Recently such a process has taken the form of a system wherein a particle form solid catalytic material is cyclically passed through a conversion zone wherein it is contacted with hydrocarbon vapors and a regeneration zone wherein it is contacted with a combustion supporting gas acting to burn off a contaminant deposited on the catalyst in the conversion zone. A commercially successful process of this type is the "Thermofor" catalytic cracking process.

In the operation of a "Thermofor" catalytic cracking unit, it is essential that the temperature vertically throughout the reactor and temperatures vertically and horizontally throughout the burners or regenerators be maintained at certain predetermined levels. With a multiplicity of burners or regenerators it is essential that the temperature group in each burner be related. It is desirable at the same time to readjust temperature levels if the volume of charge passing through the unit is to increase, or if certain other conditions are to be met.

The temperature conditions throughout the reactor and regenerator are usually measured by means of thermocouples advantageously placed at different vertical levels throughout the height of the reactor or regenerator. These thermocouples are connected to separate recording and indicating circuits. It is not unusual to use as many as twenty separate thermocouples in a single reactor or regenerator which necessitates a like number of individual indicators for indicating the temperature registered by each thermocouple. During the operation of a "Thermofor" catalytic cracking unit it is necessary that the zone adjacent each thermocouple be kept within a narrow range. Each zone may have a different temperature range, therefore, no two of the plurality of indicating devices, in the example used, twenty, when operating under the proper conditions, would necessarily read the same. Therefore, it is readily apparent that it is no small task for the operator of the unit to try to watch all of these indicators and at the same time make necessary adjustments to the unit to maintain the necessary conditions in all zones of the reactor or regenerator.

The present invention solves the problem for the operator by providing a graphic indicator which will give in a single diagram, an indication of the conditions existing in all of the zones in the reactor or regenerator and at the same time, if desired, compare these conditions to a characteristic curve that represents optimum operating conditions.

This is accomplished by providing a panel with a plurality of vertically spaced, horizontally movable indicators which move with reference to adjacent temperature scales carried by the panel. The indicators are selectively operated through an electrical system that is controlled by a rheostat or a slide wire mounted on the same shaft with the slide wire in the multipoint potentiometer temperature recorder which this invention supplements.

Therefore, the primary object of this invention is to provide a graphic indicator that will show on a single chart or diagram the conditions existing in all of the zones of a reactor or regenerator.

Another object of this invention is to provide a graphic indicator that will accurately and simultaneously show a plurality of related temperatures.

Still another object of this invention is the provision of a graphic indicator that will give a temperature profile of a regenerator or reactor and means for operating same.

This invention further contemplates electrical means for selectively operating a plurality of indicators to effect a graphic indication of the conditions existing in a continuous processing system.

It is a further object of this invention to provide a graphic indicator that can be operated through an electrical system by a conventional multipoint potentiometer recorder.

Another object is the provision of a graphic indicator that is fully automatic in its operation.

Other objects and advantages will become apparent from the following detailed description when considered with the drawings, in which Figure 1 is a diagrammatic illustration of a "Thermofor" catalytic cracking operation;

Figure 9 is a still further modified form of electrical control system for the graphic indicator.

Figure 1:
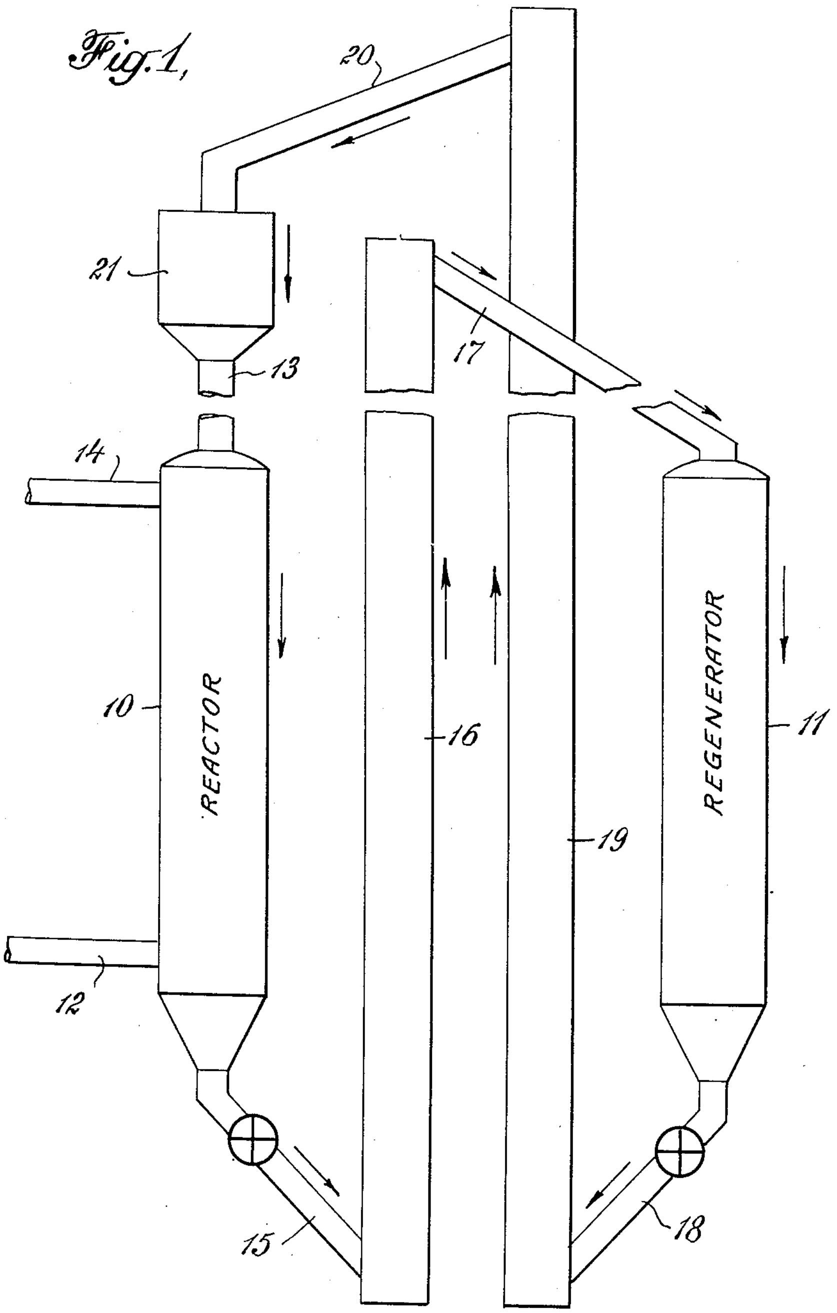

Referring to the drawings in detail, particularly Figure 1, there is shown diagrammatically a "Thermofor" catalytic cracking unit adapted for continuous operation comprising a reactor 10 and a regenerator or burner 11. Hydrocarbon gases to be cracked are fed into the reactor through an inlet pipe 12. These gases are introduced in countercurrent to the flow of catalyst, usually in pellet form, that is admitted through the inlet pipe 13. The cracked gases are drawn off by way of outlet 14 and are selectively passed on to other stages of the process not shown. The catalyst with pellets coated with coke passes out of the reactor at the bottom through an outlet pipe 15, through which it is fed to an elevator 16. Elevator 16 carries the catalyst up to an elevator discharge 17 through which it is fed by gravity directly into the regenerator or burner 11. The catalyst passes downwardly through the regenerator traversing a plurality of zones having controlled temperature where air is fed into the regenerator to burn off the coke deposited on the catalyst while passing through the reactor. Each zone traversed by the catalyst therefore has controlled heating and/or controlled cooling. The regenerated catalyst leaves the regenerator through the outlet 18 through which it is caused to flow into a second elevator 19 which raises the catalyst and dumps it through the elevator outlet 20 into a hopper 21. The hopper 21 feeds the catalyst back into the reactor at a controlled rate where it is again used for cracking the hydrocarbon gases. Since this cycle is continuous the need for a multiplicity of controls is apparent, and wherever a control is needed an indicator of the condition to be controlled must be used.

Figure 2:
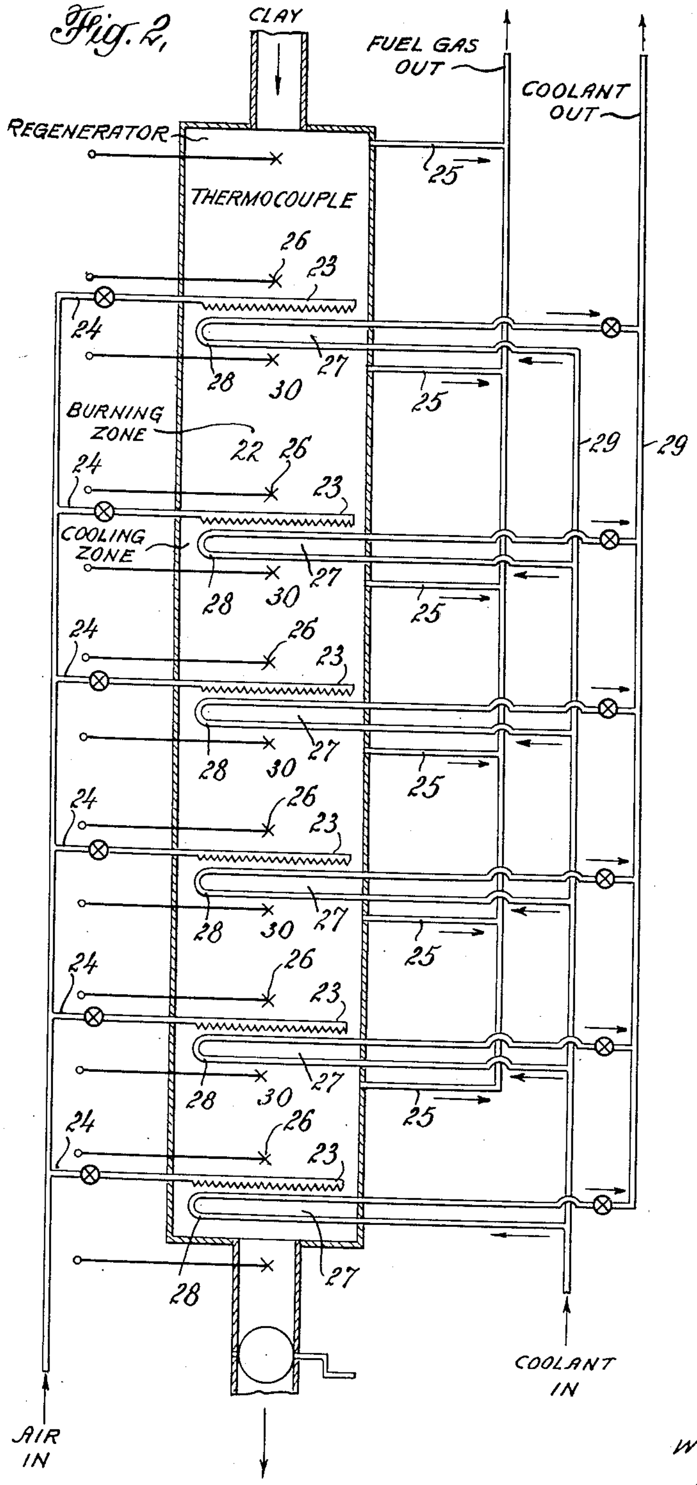
Figure 2 is a vertical section of a regenerator or burner unit showing the location of controlled temperature zones.

As an example of the many controls needed, Figure 2 shows a regenerator in vertical section having a plurality of burning zones, such as shown at 22, into which air is fed by means of tuyeres 23 that are connected to supply pipes 24, for the purpose of burning the coke from the catalyst. The catalyst, having the coke deposited thereon, is fed into the regenerator by means of pipe 17 at a controlled rate at a temperature falling within the range of 700–1200° F. The catalyst, by gravitational force, passes through the successive zones and out through the outlet 18. As the catalyst traverses each zone, the air admitted by the tuyeres 23 causes a portion of the deposit carried by the catalyst to be burned off, thereby raising the temperature of the catalyst. The products of combustion escape through the outlets 25. If the temperature exceeds a certain critical temperature the catalyst will be ruined. Therefore, thermocouples 26 are inserted in each burning zone by means of which the temperature can be watched and controlled accordingly. There are interposed between the burning zones 22, cooling zones 27. Coolant is supplied to these zones by means of pipe coils 28 that are connected through suitable control valves to supply lines 29. As the catalyst with temperature raised passes each of the burning zones 22 it enters one of the cooling zones 27 where its temperature is brought down to a predetermined level. Thermocouples 30 are inserted in these cooling zones so that the amount of cooling in each zone can be watched and controlled. The catalyst, therefore, in traversing the regenerator 11, successively passes through alternate burning and cooling zones. It is not unusual to have as many as ten burning zones and as many cooling zones in a regenerator, each one having at least one thermocouple and associated indicator. No two of the indicators would necessarily read the same temperature, but they would bear an overall relationship. In addition to the twenty thermocouples required for the heating and cooling zones one is needed in the inlet to indicate the temperature of the catalyst as it enters the regenerator and one is needed in the outlet to indicate the temperature of the catalyst as it leaves. For the regenerator alone, by prior art methods, twenty-two separate indicators would be needed. As pointed out above it is no small job for an operator to watch twenty-two disassociated indicators and make the necessary adjustments at the same time to maintain the desired operating conditions in the regenerator. It is to a problem of this character that this invention has direct application.

The nearest approach to a solution of this problem has been the use of multipoint recorders which record on a single recorder strip a plurality of temperatures. Although the multipoint temperature recorder is a very efficient instrument for making a permanent record of temperatures sensed by the various thermocouples it does not provide the operator with a continuous graphic indicator that will show at a glance a temperature profile of the regenerator.

Figure 3:
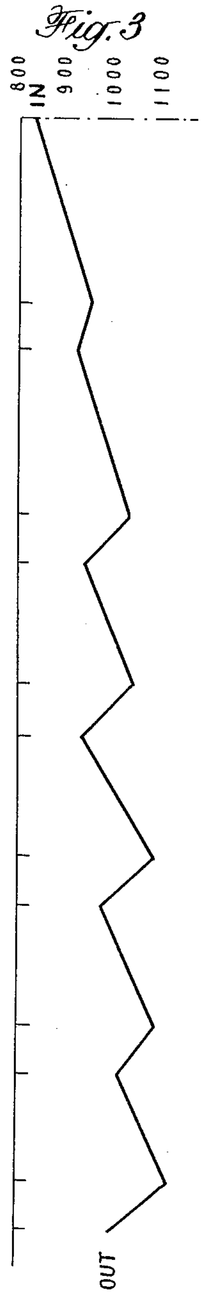
Figure 3 is a characteristic curve illustrating operating conditions in a "Thermofor" catalytic cracking regenerator which has been plotted with temperature as abscissa and position of thermocouples as ordinates.

If the desired thermocouple temperatures are plotted as abscissa against the position of the thermocouples as ordinates, a characteristic curve representing the desired operating conditions will be obtained. Such a curve is illustrated in Figure 3. A curve of this character, in a manner to be described later, can be placed on a graphic indicator panel and will serve as a reference curve for another which represents instantaneous operating conditions, that can be plotted electrically on the same panel.

Figure 4:
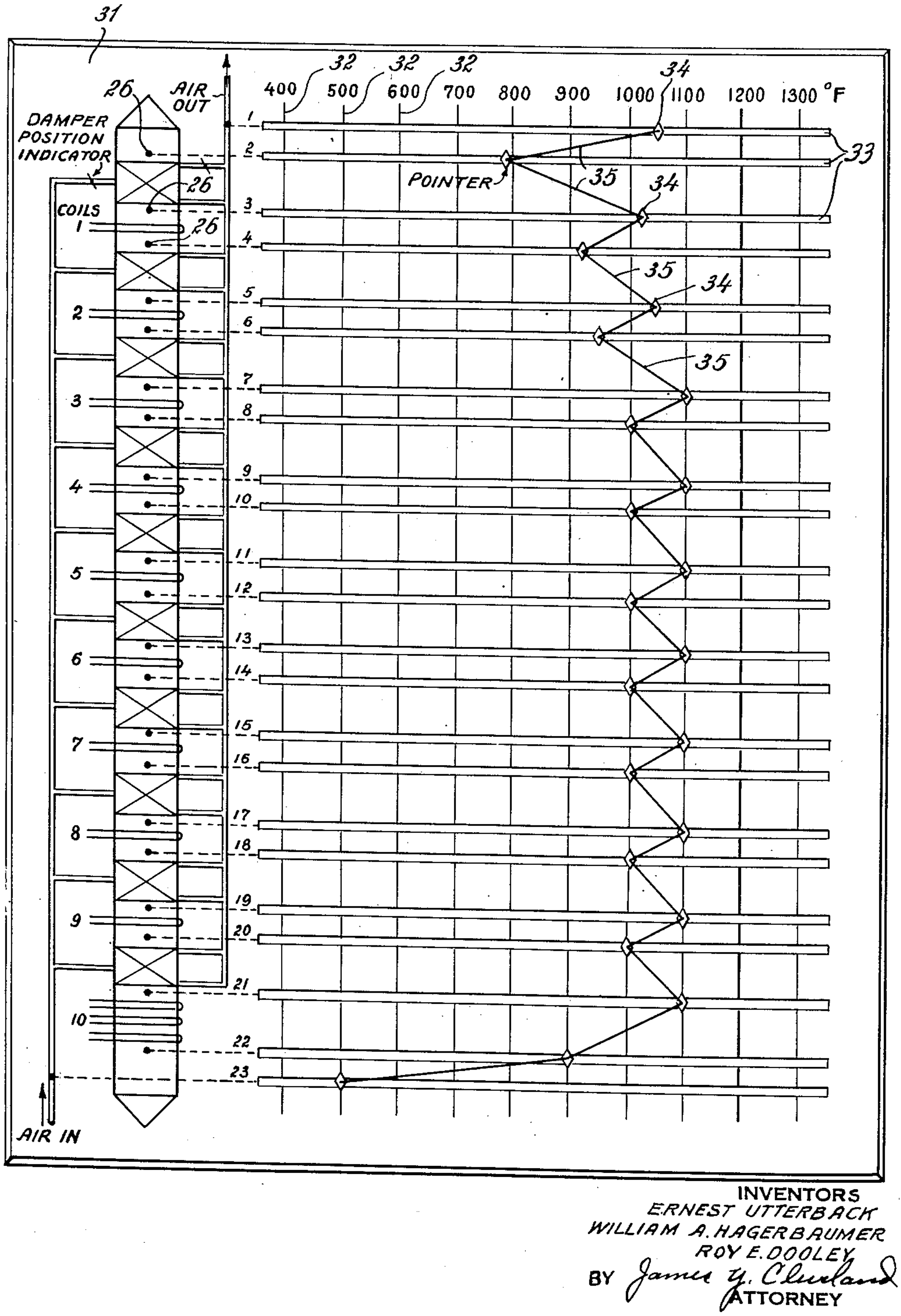
Figure 4 is a vertical elevation of the graphic indicator as contemplated by the present invention.

The graphic indicator as contemplated by the present invention is illustrated in Figure 4. Here it is shown as an indicator of temperatures in the different zones of a regenerator in a "Thermofor" catalytic cracking system. The panel 31 is provided at its left side with a diagrammatic illustration of a vertical section of the regenerator showing the burning and cooling zones and the positions of the thermocouples which sense the temperatures that are to be indicated. The right side of the panel is provided with a system of coordinates comprising the vertical lines 32 and the transverse slots 33. The horizontal axis of the system represents degrees Fahrenheit (400°–1300°) and the vertical axis represents the position of the thermocouple.

The slots 33 are respectively provided with indicators or pointers 34 that are adapted to move in their respective slots to indicate the temperatures measured by the thermocouples 26. These pointers, when connected over the face of the panel by elastic lines 35 will describe a curve which indicates the instantaneous operating conditions of the regenerator. As pointed out above, this curve can be readily compared to one which represents optimum operating conditions that has been drawn on the board. The optimum operating conditions curve can be painted on the panel if the operating conditions are not to be changed, but if a change of operating conditions is contemplated the curve can be placed on the panel by chalk so that it can be erased.

Figure 5:
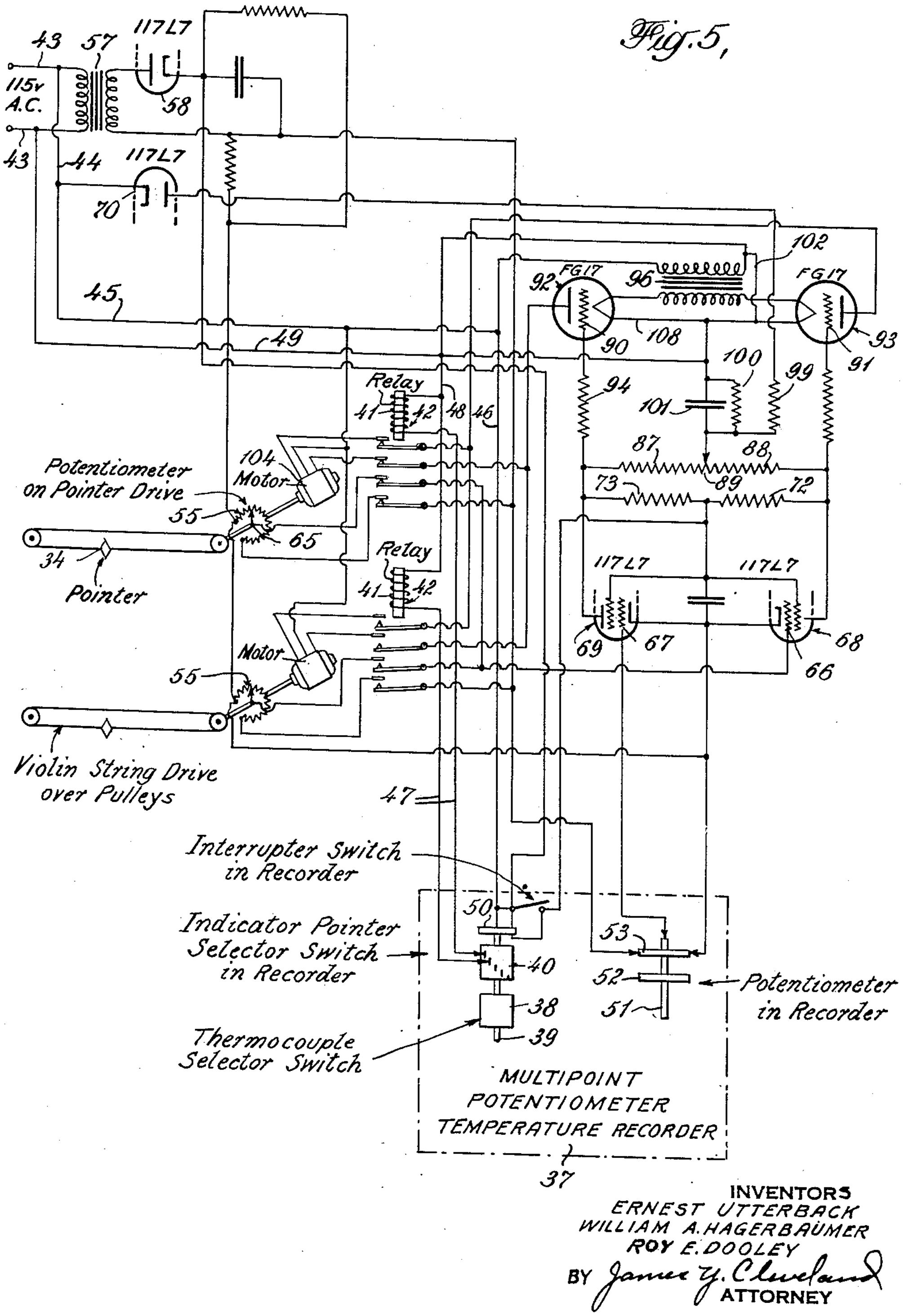
Figure 5 is a diagrammatic illustration of one form of electrical control system for the graphic indicator.

In Figure 5 there is illustrated the preferred embodiment of the electrical system for operating the pointers on the graphic temperature indicator.

Control and operation of the system is effected through a multipoint temperature recorder 37. The recorder is conventional and is of the type now in common use for recording the thermocouple temperatures.

The conventional recorder, diagrammatically illustrated at 37 is already equipped with thermocouple selector switch 38 which is mounted for operation on a shaft 39. For the present invention an additional selector switch 40 is mounted on shaft 39 and is synchronized with switch 38 for selectively preparing electrical circuits for the operation of the pointers 34 by completing power supply circuits through the coils 41 of relays 42. Power is supplied to the windings 41 of the relays 42 from a 110–115 volt A. C. source through conductors 43, 44, 45 and 46, selector switch 40, conductors 47, 48 and 49. Energization of one of the relays 42 will cause its armature, which carries four contactors, to close circuits for means which actuate one of the pointers 34.

In addition to the selector switch 40 a commutator 50 is mounted on shaft 39 for rotation therewith. Its function will be described in connection with the pointer operating circuits.

The conventional multipoint potentiometer recorder is equipped with a second shaft 51 that is driven by the recorder motor to drive a slide wire 52. For purpose of the present invention a second slide wire 53 is mounted on the outer end of shaft 51 for rotation therewith.

The system illustrated in Figure 5 is for the selective operation of all of the pointers 34. In order to more readily understand the operation of this system, reference will first be made to Figure 6, which illustrates the manner in which a single pointer is operated.

Figure 6:
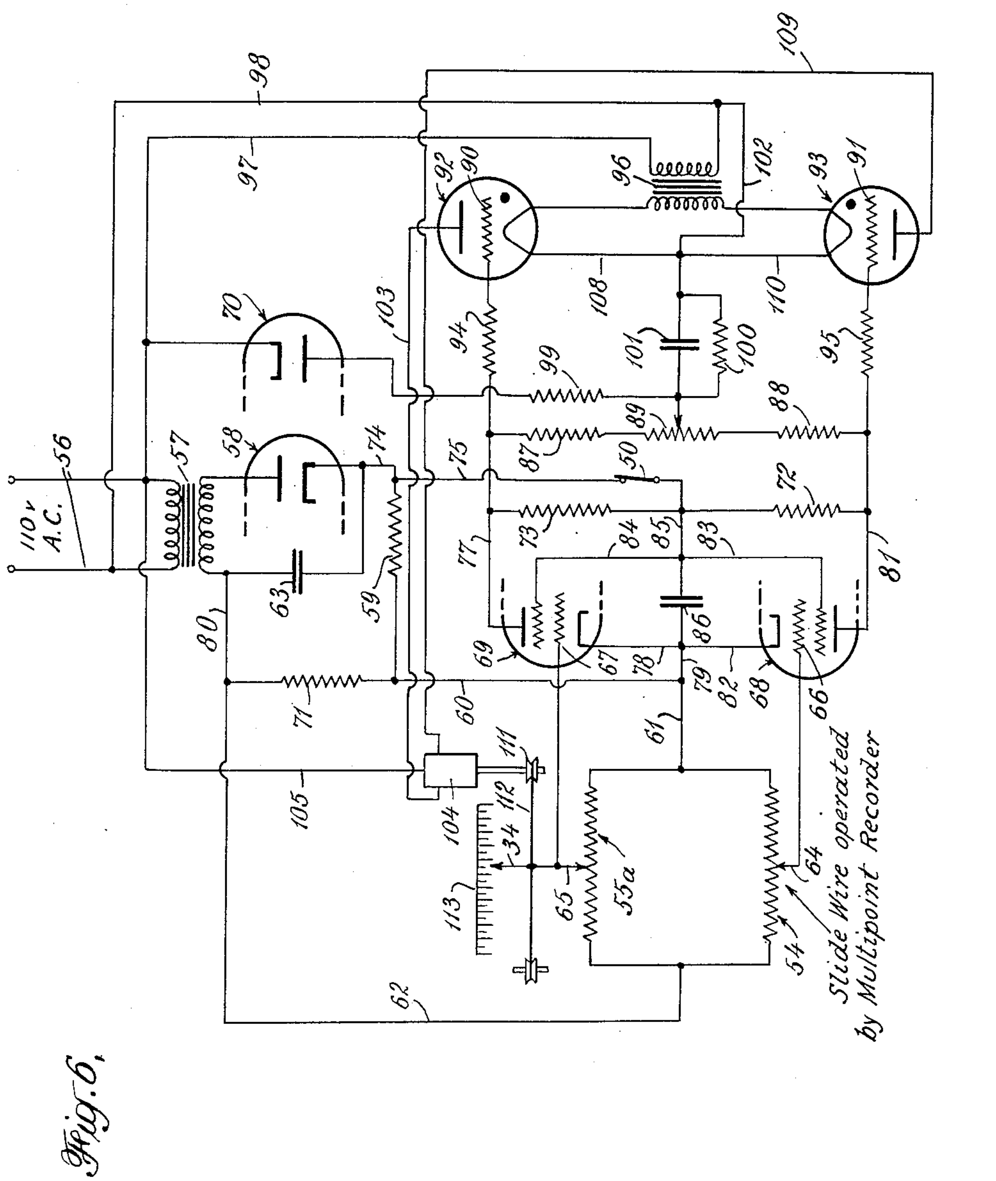
Figure 6 is a simplified wiring diagram showing the electrical system as applied to one pointer.

Referring now to Figure 6, voltage divider 54 corresponds to the slide wire 53 of Figure 5. The resistance element of the voltage divider 54 is connected in parallel with the resistance element of a second voltage divider 55*a* which corresponds to the potentiometer 55 of Figure 5. D. C. voltage is supplied to this parallel combination from a 110 volt, A. C. source, not shown, through the conductors 56, transformer 57, rectifier 58, resistance 59, conductors 60, 61 and 62. Condenser 63 is provided to reduce the ripple of the rectified voltage. Resistance 59 is provided to lower the voltage applied to the voltage dividers or potentiometers 54 and 55*a*.

Contactors 64 and 65 of the potentiometers 54 and 55*a* are respectively connected to the grids 66 and 67 of the tetrode sections 68 and 69 of two type 117-L-7 tubes. The diode sections of these tubes are the rectifiers 58 and 70. The position of the contactors 64 and 65 determines the negative bias potential applied to the tetrodes 68 and 69. The resistance values of potentiometers 54 and 55*a* and resistor 59 are chosen so that this bias will have a range from zero to cutoff for the tetrodes 68 and 69. Resistance 71 is provided to by-pass a portion of the current flowing through the resistance elements of the potentiometers 54 and 55*a* so that a wider range of adjustment can be provided for the bias potential placed on the grids 66 and 67 of tubes 68 and 69, respectively.

Tube 68 and resistance 72 form one-half of a Wheatstone bridge while tube 69 and resistance 73 form the other half. The plate of tube 69 is supplied with a D. C. potential from transformer 57, diode 58, conductors 74 and 75, commutator 50, resistance 73, conductors 77, 78, 79 and 60, resistance 71 and the conductor 80. The plate of tube 68 is supplied with D. C. potential from transformer 57, through diode 58, conductors 74 and 75, commutator 50, resistance 72, conductors 81, 82, 79 and 60, resistance 71 and conductor 80. The screens of tubes 68 and 69 are connected together with the conductors 83 and 84 and are supplied with potential from the plate circuits of the tubes by conductor 85. Condenser 86 forms a by-pass to the cathodes of tubes 68 and 69 for the plate and screen grid circuits.

The signals developed in the plate circuit of these two tubes when impressed across the resistors 72 and 73, cause a current to flow through the resistances 87 and 88 and the resistance element of the potentiometer 89. This potential is applied to the grids 90 and 91 of the gas triodes 92 and 93, respectively through the resistances 94 and 95. The functions of the resistances 94 and 95 are to limit the grid current in the gas triodes on the negative swings of the alternating plate voltage. The potentiometer 89 provides a means for compensating for the difference in characteristics of the gas triodes 92 and 93. The filaments of tubes 92 and 93 are supplied with A. C. power through the transformer 96 whose primary is connected to the 110 volt, 60 cycle source through conductors 97 and 98. A common D. C. grid bias potential for tubes 92 and 93 is provided by rectifier 70, through resistors 99 and 100 and condenser 101. The bias circuit is completed by the conductor 102, which is connected to the power supply conductor 98. The plate circuit of gas triode 92 includes conductor 103, one winding of the reversible motor 104, conductor 105, the 110 volt, 60 cycle power supply and conductors 98, 102 and 108. The plate circuit of gas triode 93 includes conductors 109, the other winding of the reversible motor 104, conductor 105, the 110 volt, 60 cycle power supply and conductors 98, 102 and 110.

As shown diagrammatically in Figure 6 the reversible motor 104, through the pulley 111 and the belt 112, formed of piano wire or wire such as that used in violin strings, drives the contactor 65, carried by the belt, on the resistance element of potentiometer 55a. Also secured to belt 112 is the pointer 34 which cooperates with the stationary scale 113 that is calibrated in temperature units.

In the operation of the circuit of Figure 6, a change of the adjustment of potentiometer 54, by the rotation of shaft 51 in the multipoint potentiometer recorder 37, will cause a proportional change in the current passed by tube 68. This unbalances the bridge and a potential appears across resistances 87 and 88 and potentiometer 89. This potential appears as the result of the difference in potential developed across the resistances 72 and 73. The direction of the potential appearing across the resistances 87 and 88 and the potentiometer 89 determines which of gas triodes of tubes 92 and 93 will become conductive. When one of these tubes becomes conductive, power is passed to motor 104 which turns in the direction necessary to move contactor 65 of potentiometer 55a and changes the bias on tube 69. This balances the bridge, and and the potential across resistors 87 and 88 and potentiometer 89 disappears and allows the gas triode to again become non-conductive on the next cycle of the alternating plate potential.

Commutator 50 is connected in the plate circuit of tubes 68 and 69 so that the plate potential can be taken off these tubes while the circuit through the relays 41 is broken by the selector switch 40 changing from one contact to the next. This prevents a surge of current in the plate circuit of these tubes due to the momentary removal of the bias therefrom when connection is changed from one of the voltage dividers 55a to the next which is associated with the next pointer to be actuated.

Now again, referring to Figure 5, it will be seen that rotation of shaft 39 to cause selector switch 38 to select a thermocouple whose temperature is to be recorded by the recorder 37 causes selector switch 40 to complete a circuit to the power supply for one of the relays 41. Energization of one of the relays 41 in addition to completing motor circuits completes circuits through one of the voltage dividers 55 to operate the pointer 34 associated therewith. After selection of the thermocouple, whose temperature is to be indicated, and the pointer, that is to indicate that particular temperature, shaft 51 of the recorder 37 turns to record the temperature, thereby causing a rotation of the slide wire 53 which corresponds to the voltage divider 54 of Figure 6, to change its adjustment. This, as described in connection with Figure 6, unbalances the bridge which comprises the tubes 68 and 69 and resistances 72 and 73. These two tubes are connected in such a manner that the voltages developed across resistances 72 and 73 will be subtracted and the resultant potential will be applied across resistances 87 and 88 and potentiometer 89.

Depending upon the direction of the current through resistances 87, and 88 and potentiometer 89, one of the gas triodes 92 or 93 will fire and current will flow through one winding of the reversible motor 104. Motor 104 will then drive the contactor 65 of the slide wire or voltage divider 55 to a position such that the bridge will again be balanced. When the bridge is balanced tube 92 or 93 that fired will cease firing and motor 104 will stop. The pointer 34 being secured to the belt 112, whose drive is synchronized with that of contactor 65 will indicate this new temperature on the scale carried by the panel.

Figure 7:
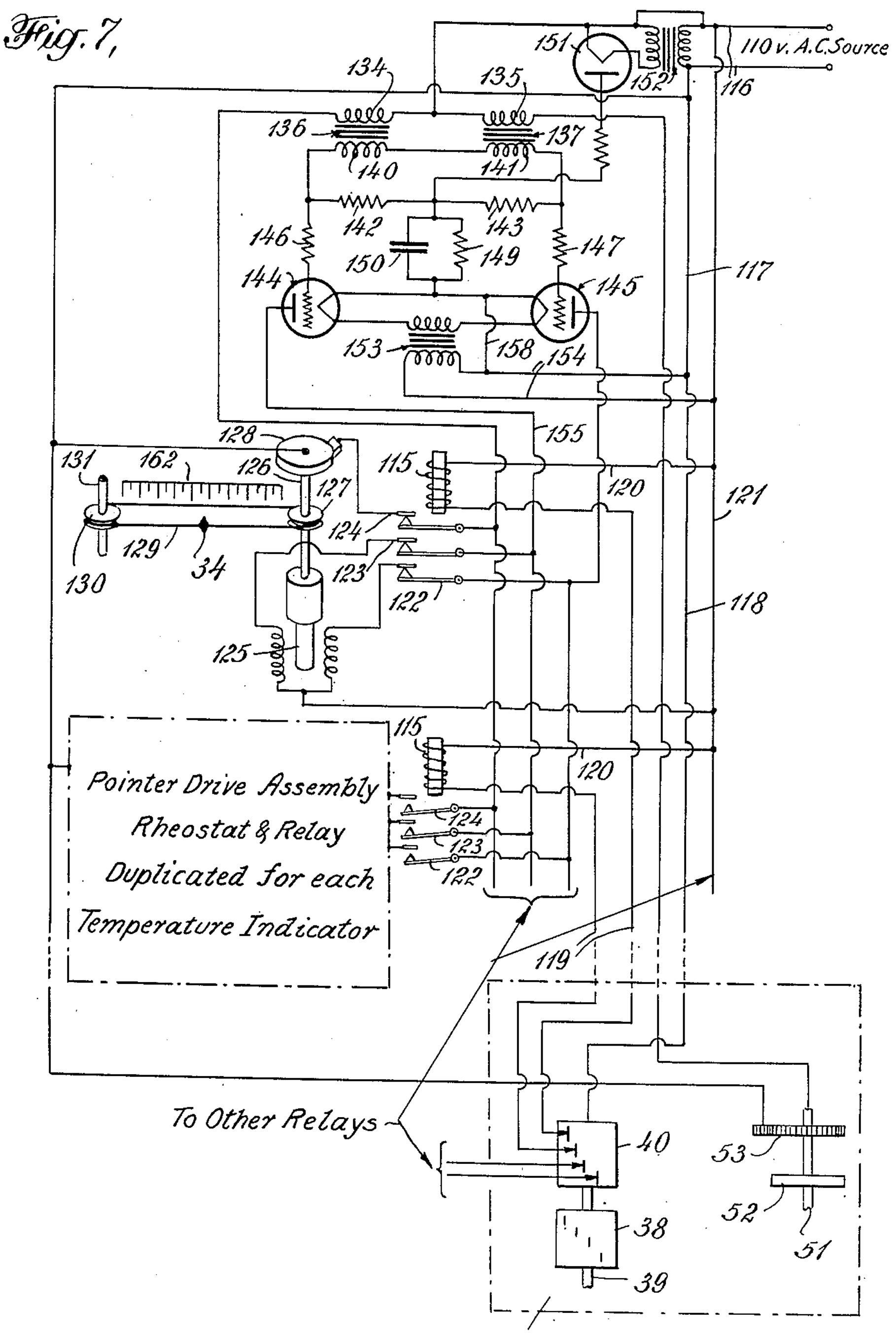
Figure 7 is a diagrammatic illustration of a modified form of electrical control system for the graphic indicator.

A modification of the operating mechanism for the pointers 34 is diagrammatically shown in Figure 7. In the same manner as described in connection with Figures 5 and 6, an additional selector switch 40 for selecting the pointer to be operated is added to that of the conventional recorder 37. Additionally, a second slide wire 53 is mounted on the same shaft with the one that is already in the conventional recorder. Selector switch 40 completes power circuits for the solenoid operated relays 115. Power is supplied from a 110 volt, alternating current source through conductors 116, 117 and 118, selector switch 40, conductors 119, 120 and 121. Energization of one of the solenoid operated relays 115 causes its armature to close three contactors 122, 123 and 124. Contactor 122 and 123 complete circuits through the windings of a reversible motor 125 which, through shaft 126, drives the pulley 127 and slide wire 128. Pulley 127 drives a belt 129 which passes around a second pulley 130 mounted on a shaft 131. Belt 129, as described above, may be formed of piano wire or similar material. Belt 129 carries a pointer 34 which cooperates with a stationary scale to indicate temperature. In this form of the invention, although each pointer 34 is provided with a separate reversible motor 125 and slide wire 128, a common means is used for selectively supplying power to them through the relays 115.

Figure 8:
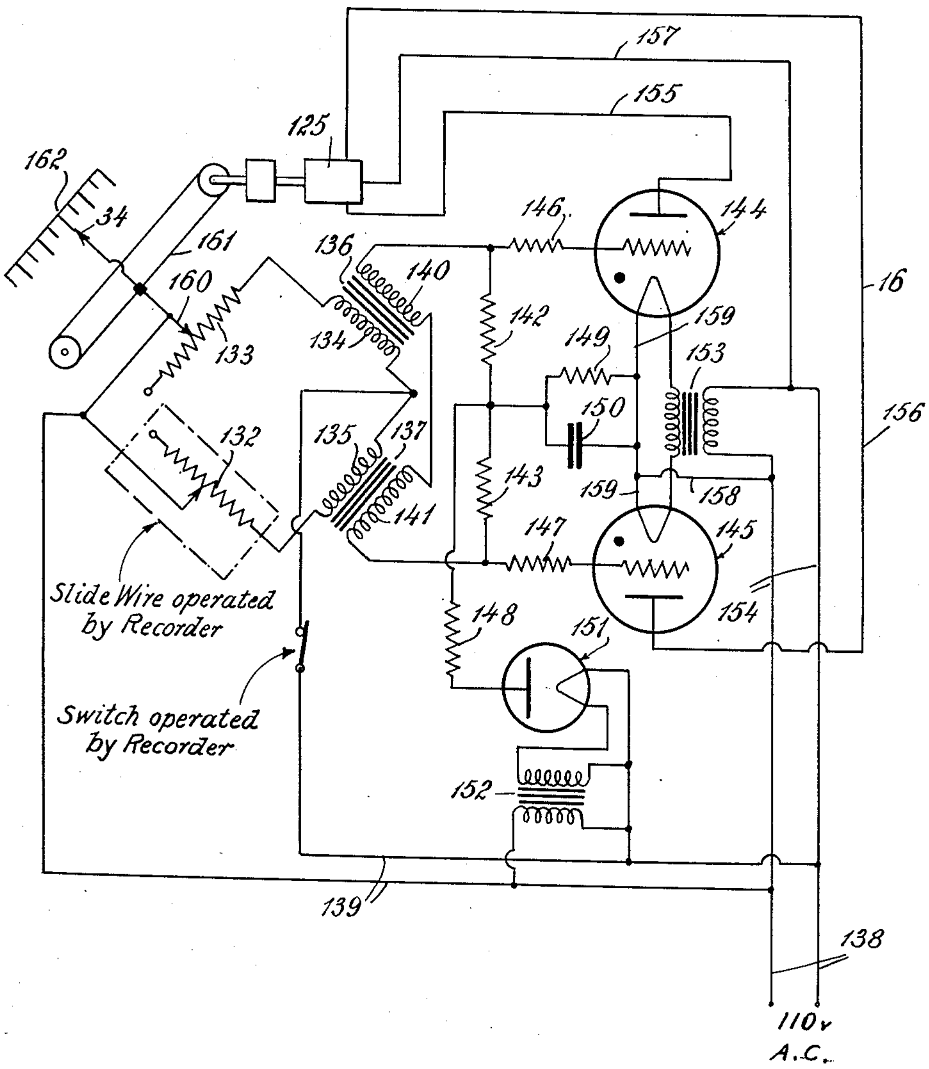
Figure 8 is a simplified wiring diagram showing the system disclosed in Figure 7 as applied to a single pointer.

In Figure 8 the circuit for supplying power to a single motor is shown in detail. In this diagram, rheostat 132 corresponds to the slide wire 53 in the recorder of Figure 7 and rheostat 133 corresponds to one of the slide wires 128 of Figure 7. Rheostat 132 with rheostat 133 and the primary windings 134 and 135 of transformers 136 and 137, respectively, form a Wheatstone bridge circuit. The Wheatstone bridge circuit is supplied with power from a 110 volt A. C. source, not shown, through conductors 138 and 139. The secondary windings 140 and 141 of transformers 136 and 137 are connected in series and across the resistances 142 and 143. Resistors 142 and 143 are connected respectively in the grid circuits of gas triodes 144 and 145. Resistances 146 and 147 are provided to limit the grid current during the negative voltage swings of the alternating plate potential supplied to these tubes. A common direct current bias potential for tubes 144 and 145 is provided by impressing a direct current potential on the R. C. circuit comprising resistors 148 and 149 and the capacitor 150 through the diode rectifier tube 151. Transformer 152 serves to supply the proper potential for the filament or heater of the diode rectifier 151. The filaments of gas triodes 144 and 145 are supplied with power through transformer 153 whose primary is connected through conductors 154 to the 110 volt alternating current source. The plate circuit of gas triode 144 includes the conductor 155, one winding of the reversible motor 125, conductor 157, the 110 volt A. C. power supply and conductors 158 and 159. The plate circuit of gas triode 145 includes the conductor 156, the second winding of reversible motor 125, conductor 157, the 110 volt alternating current power supply and conductors 158 and 159.

The operation of the circuit shown in Figure 8 to actuate one of the pointers 34 is as follows: When the bridge is in balance the current from the 110 volt A. C. source divides itself equally between two halves of the bridge, one-half being made up of rheostat 133 and the primary winding 134 of transformer 136 and the other half comprising the rheostat 132 and the primary winding 135 of transformer 137. The induced potential in the secondary winding 140 of transformer 136 is equal to and 180° out of phase with the induced potential in the secondary winding 141 of transformer 137. Under these conditions no potential will exist across the two resistors 142 and 143. The negative grid bias potential for gas triodes 144 and 145 is sufficient that the tubes will not become conductive when the bridge is balanced. When the recorder 37 varies rheostat 132 in a direction that will decrease the resistance of rheostat 132 the bridge becomes unbalanced and more current will flow in that half than in the other half, resulting in an increased potential in the secondary winding 141 of transformer 137. This secondary potential being greater than the potential in the secondary winding 140 and 180° out of phase with it produces a potential across resistors 142 and 143 equal to the difference of the potentials in the secondary windings 140 and 141 and in phase with the potential of secondary winding 141. This potential across resistors 142 and 143 will add to the negative bias on the grid of tube 145 and will subtract from the negative bias from the grid of tube 144. This causes tube 144 to become conductive and power is supplied to motor 125 which rotates in the direction to drive contactor 160 of rheostat 133 toward a new bridge balance point. Since the belt 161 which drives contactor 160 also carries the pointer 34 it will be carried to a new position on the scale 162. When contactor 160 has been moved to the new balance point, the current is again equally divided in the two halves of the bridge and tube 144 becomes non-conductive because there is no potential across resistors 142 and 143 and the negative bias on its grid is again sufficient to keep it from being conductive.

When the recorder varies rheostat 132 in a direction that will increase the resistance of rheostat 132, the bridge becomes unbalanced and less current will flow in that half than in the other half resulting in a decreased potential in the secondary winding 141. This potential being less than potential in the secondary winding 140 and 180° out of phase with it. there will be produced across resistors 142 and 143 a potential that is equal to the difference of the potentials in the secondary windings 140 and 141 and in phase with the potential of secondary winding 140. This potential across resistors 142 and 143 will add to the negative bias on the grid of tube 144 and will subtract from the negative bias on the grid of tube 145. This causes tube 145 to become conductive and power is supplied to motor 125 which rotates in the direction to drive contactor 160 toward a new balanced position. When contactor 160 has been moved to the new balanced point the current is again equally divided in the two halves of the bridge and the tube 144 becomes non-conductive because there is no potential across resistors 142 and 143 and the negative bias on its grid is again sufficient to keep it from being conductive.

Again referring to Figure 7 it will be seen that the circuits of Figure 8 are used to actuate the separate pointer drives selectively through the relays 115.

In Figure 9 there is shown still another modification of the present invention. This differs from the embodiment shown in Figures 7 and 8 in that a single motor selectively drives the pointers 34 and the contactors 160 therough solenoid operated clutches.

In this form of the invention selector switch 40, which is synchronized with the recorder thermocouple selector switch 38, completes an energizing circuit through one of the solenoid operated relays 200. The armature of that relay closes a pair of contacts 201, and 202 carried thereby to set up indicator operating circuits. Assuming for purpose of explanation that the top relay has been actuated then power is supplied to the winding of the top solenoid operated clutch 203 to draw a gear 204 that is splined or keyed to the shaft 205 of motor 206, up into engagement with a second gear 207. Gear 207, through shaft 208, drives a pulley 209 and belt 210 to move the contactor 160 and pointer 34.

Energization of the top relay also connects rheostat 133 in a bridge circuit with the primary windings of transformers 136 and 137 and the slide wire 53 operated by the recorder 37. Rheoseat 133 with winding 134 forms one-half of the bridge circuit and slide wire 53 and winding 135 forms the other half of the bridge circuit. A. C. power is supplied to the bridge by conductors 116, 211 and 212 to the juncture of the primary windings 134 and 135, and conductors 117 and 213 to the juncture of conductors leading to the rheostats 53 and 133. Unbalancing the bridge by an alteration of the setting of rheostat 53 has the same effect as that explained in connection with Figures 7 and 8.

Although the present invention has been described in detail in connection with units for the catalytic conversion of hydrocarbons, it is to be understood that it has application wherever multipoint recorders can be used. Additionally, only three modifications have been shown and described, but it is to be understood that the invention is only to be limited by the appended claims.

We claim:

1. A graphic indicator for continuously indicating a plurality of varying conditions in a continuously operating system that comprises a panel having a system of rectangular coordinates thereon; a plurality of pointers corresponding in number to the number of conditions to be indicated spaced along one axis of said coordinates, adapted to be moved over the other axis of said coordinates; reversible motor means for each of said pointers for actuating the same when said reversible motor means is energized; energizing means selectively responsive to said conditions for energizing said reversible motor means in the direction of and in proportion to the magnitude of the variation in one of said conditions being indicated; a pointer selector for selectively establishing energizing relation between said energizing means and said reversible motor means, said pointer selector being adapted to establish said energizing relation synchronously with respect to the selective response of said energizing means to the variation in said conditions.

2. A graphic indicator for continuously indicating a plurality of varying conditions in a continuously operating system that is adapted for use in combination with a multipoint potentiometer recorder that comprises in combination a panel having a system of rectangular coordinates thereon; a plurality of pointers, corresponding in number to the number of conditions to be recorded and to be indicated spaced along one axis of said coordinates and adapted to be moved over the other axis of said coordinates; pointer selector means actuated by said recorder and synchronized therewith with respect to conditions recorded thereby and adapted to complete electrical circuits associated with the operation of each of said pointers; an impedance bridge circuit; means for supplying power to said bridge circuit; means also actuated by said recorder for varying the impedance of one element of the bridge circuit to unbalance the bridge; means operable by the unbalanced bridge current through said circuits completed by said pointer selector means for actuating the pointer associated with said circuit an amount proportional to the change in the condition to be indicated; additional means actuated by said pointer actuating means for varying a second impedance element in said bridge circuit to bring the bridge back into balanced condition.

ERNEST UTTERBACK.
WILLIAM A. HAGERBAUMER.
ROY E. DOOLEY.

REFERENCES CITED

The following references are of record in the file of this patent:

UNITED STATES PATENTS

| Number | Name | Date |
|---|---|---|
| 1,161,254 | Scanes et al. | Nov. 23, 1915 |
| 1,376,633 | Obermaier | May 3, 1921 |
| 1,878,035 | Vickery | Sept. 20, 1932 |
| 2,135,512 | Holven | Nov. 8, 1938 |
| 2,135,513 | Holven | Nov. 8, 1938 |
| 2,398,987 | Ziebolz | Apr. 23, 1946 |